(No Model.)

R. A. DENISON.
ELECTRIC CONDUCTOR.

No. 323,920. Patented Aug. 11, 1885.

WITNESSES,
Charles Hannigan
Chas. C. Reynolds

INVENTOR,
Russell A. Denison.
by Geo. H. Remington
Atty.

UNITED STATES PATENT OFFICE

RUSSEL A. DENISON, OF PROVIDENCE, RHODE ISLAND.

ELECTRIC CONDUCTOR.

SPECIFICATION forming part of Letters Patent No. 323,920, dated August 11, 1885.

Application filed May 8, 1885. (No model.)

*To all whom it may concern:*

Be it known that I, RUSSEL A. DENISON, a citizen of the United States, residing at Providence, in the county of Providence and State of Rhode Island, have invented certain new and useful Improvements in Electric Cables; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention relates to certain improvements in wire cables adapted to conduct an electric current for telegraphic, telephonic, and electric lighting purposes; and it consists, first, in the employment of a non-conducting shield or layer composed of sheet or powdered mica combined with asbestus or other equivalent material.

The invention consists, secondly, of a cable composed of a central conducting-wire, a non-conducting or insulating layer of cowdie-gum and mineral pitch, (suitably tempered,) a layer of mica and asbestus continuously covering said gum coating, and an external non-conducting coating also composed of cowdie-gum and mineral pitch or asphaltum; thirdly, the combination in a wire cable covered with one or more layers of non-conducting material of the continuous layer or shield of mica and asbestus.

The object of my invention is to produce a cable adapted for electrical purposes, which overcomes in a greater degree than heretofore the disadvantage and loss of power by induction, the wire of such improved cable at the same time being perfectly protected from the action of the atmosphere and water, the cable also being able to withstand a very high temperature without impairing its efficiency.

My improved cable is equally adapted to be employed in aerial, underground, or submarine systems, said cable also being produced at a greatly-reduced cost as compared with other insulated cables adapted for analogous purposes.

A distinctive feature of the present improved cable resides in the novel employment of a continuous course or layer of combined mica and asbestus which is embedded in the homogeneous semi-plastic material incasing the metallic wire.

For the purpose of fully describing and claming my improved insulated wire cable I have prepared the accompanying sheet of drawings, in which—

Figure 1:
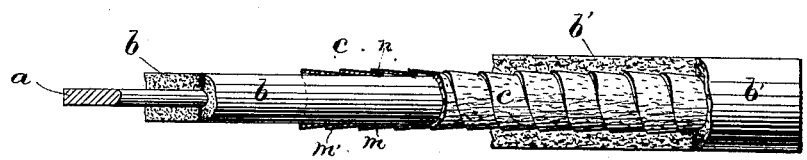
Figure 2:
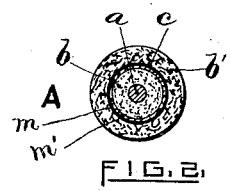
Figure 3:
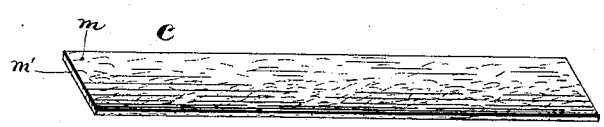

Figure 1 represents a longitudinal view of a section of the cable, and showing a portion of each of its several layers of insulation in central section. Fig. 2 is a cross-sectional view; and Fig. 3 is a perspective view of a portion of the combined mica and asbestus strip which is adapted to be spirally wound around the first or initial layer of insulation, as shown in Fig. 1.

The following is a detailed description of my invention:

A, again referring to the drawings, designates the cable as a whole, consisting of the center wire, $a$, made of copper, iron, or other suitable material, the same being initially covered with a layer or coating, $b$, of non-conducting material—as, for example, cowdie-gum combined with asphalt or mineral pitch, the latter being tempered with mineral oil to render the composition semi-plastic and adhesive.

$c$ designates a second or intermediate layer composed of mica $m$, having its under surface covered with asbestus $m'$, or other equivalent material, the same being cemented or glued to the mica. The compound $c$ is cut into sheets or narrow strips and firmly secured around the first or inner coating, $b$.

In the drawings I have represented the material $c$ as cut into a narrow continuous strip, Fig. 3, which is wound spirally around the said initial coating $b$, the edges overlapping each other, as shown at $n$, Fig. 1, thus forming a flexible and unbroken continuous mica covering. An exterior coating, $b'$, of the same or equivalent composition as the coating $b$, covers or protects the whole, all as fully represented in Fig. 1.

It is obvious that a cable thus constructed is adapted to be coiled and uncoiled without breaking or impairing the continuity of its layers, the latter at the same time being impervious to air and water, while the intermediate layer or stratum of mica and asbestus further serves to protect the wire *a* from the injurious effect of heat in a greater degree than heretofore in cables of this class. Instead, however, of using the mica in its natural or laminated state, it may be reduced to a powdered form or fine particles and distributed evenly over the asbestus paper, the surface of the latter having previously been prepared with a suitable cement or glue, for the purpose of uniting the mica and asbestus. The whole is then cut into suitable strips and wound around the gum coating *b*, substantially as hereinbefore described.

The inner and outer non-conducting coats may be made from rubber, gutta-percha, or any of its compounds, although the substitution of such material necessarily involves a vulcanizing process, and materially increases the cost of manufacture.

The method or process employed in covering the wire with the coatings *b b'* is not fully described nor deemed essential herewith, the same not forming a part of the present invention.

By means of my improved cable its electric-conducting qualities are greatly increased, thereby particularly adapting it for use in long-distance lines for telephonic purposes.

It is obvious that two or more of the improved cables may be combined to produce a compound cable, if desired.

I am aware, of course, that wires for conducting electric currents have been covered with non-conducting materials prior to my invention. I am aware, further, that mica has been employed for insulating conducting-wires. Asbestus, combined with water-glass and applied as a paste, has also been used for a like purpose. Therefore I do not claim, broadly, such construction; but the employment of mica and asbestus, in combination with such cables I deem to be both useful and novel. In view of which—

I claim and desire to secure by Letters Patent of the United States—

1. As an improved article of manufacture, the cable hereinbefore described, consisting of a central conducting-wire initially covered with a layer of non-conducting semi-plastic material or composition, a layer or coating of mica and asbestus immediately surrounding said initial coat, and a non-conducting external coating covering the whole, substantially as set forth.

2. In an insulated cable, the combination, with a central conducting-wire having two or more coats or layers of suitable insulating material, of a layer of mica and asbestus intermediate of the inner and outer coats, substantially as shown and described.

3. The improved insulated wire cable A, herein described, consisting of the central wire, *a*, the semi-plastic non-conducting coatings *b b'*, covering the wire, and a layer of mica and asbestus embedded in said semi-plastic material, substantially as shown and set forth.

4. The combination, in an insulated wire cable provided with the conducting-wire *a*, and non conducting coatings *b b'* around the same, of the combined mica and asbestus strip or strips *c* wound spirally around said coating *b*, substantially as shown, and for the purpose set forth.

5. The improved insulated wire cable A, herein described, consisting of the central conducting-wire, *a*, the non-conducting coating or layer *b*, composed of cowdie-gum and mineral pitch tempered with mineral oil immediately surrounding said wire, the layer *c* of mica and asbestus paper covering the coating *b*, and the external coating, *b'*, also of cowdie-gum and mineral pitch, continuously covering the wire and said coats *b c*, the whole combined and arranged substantially as shown, and for the purpose set forth.

In testimony whereof I have affixed my signature in presence of two witnesses.

RUSSEL A. DENISON.

Witnesses:
WM. R. DUTEMPLE,
GEO. H. REMINGTON.